United States Patent
Saito et al.

(10) Patent No.: US 9,412,987 B2
(45) Date of Patent: Aug. 9, 2016

(54) SEPARATOR FOR ELECTRIC DEVICE AND ELECTRIC DEVICE USING THE SAME

(71) Applicant: NISSAN MOTOR CO., LTD., Kanagawa (JP)

(72) Inventors: Haruyuki Saito, Yokohama (JP); Kazuki Miyatake, Yokohama (JP); Hironobu Muramatsu, Tokyo (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 153 days.

(21) Appl. No.: 14/359,819

(22) PCT Filed: Oct. 31, 2012

(86) PCT No.: PCT/JP2012/078161
§ 371 (c)(1),
(2) Date: May 21, 2014

(87) PCT Pub. No.: WO2013/077162
PCT Pub. Date: May 30, 2013

(65) Prior Publication Data
US 2014/0308566 A1 Oct. 16, 2014

(30) Foreign Application Priority Data
Nov. 25, 2011 (JP) .................................. 2011-257657

(51) Int. Cl.
*H01M 2/16* (2006.01)
*H01G 11/52* (2013.01)
*H01G 9/02* (2006.01)

(52) U.S. Cl.
CPC ............... *H01M 2/166* (2013.01); *H01G 11/52* (2013.01); *H01M 2/1653* (2013.01); *H01M 2/1686* (2013.01); *H01G 9/02* (2013.01); *Y02E 60/13* (2013.01); *Y02T 10/7022* (2013.01)

(58) Field of Classification Search
None
See application file for complete search history.

(56) References Cited

U.S. PATENT DOCUMENTS

2006/0078791 A1 4/2006 Hennige et al.
2012/0015232 A1 1/2012 Teshima et al.

FOREIGN PATENT DOCUMENTS

| JP | 2010-055942 A | 3/2010 |
| JP | 2011-065849 A | 3/2011 |
| JP | 2011-108516 A | 6/2011 |
| JP | 2011-165660 A | 8/2011 |

OTHER PUBLICATIONS

Communication and extended European search report, dated Apr. 2, 2015, from the corresponding European Patent Application No. 12851645.7.

*Primary Examiner* — Sarah A Slifka
(74) *Attorney, Agent, or Firm* — Young Basile Hanlon & MacFarlane, P.C.

(57) ABSTRACT

A separator for an electric device includes a porous substrate layer and first and second ceramic layers formed on the respective surfaces of the porous substrate layer and each containing ceramic particles and a binder. A specific surface area of the first ceramic layer is smaller than a specific surface area of the second ceramic layer, and the first ceramic layer is located towards a negative electrode of an electric device.

9 Claims, 2 Drawing Sheets

SEPARATOR FOR ELECTRIC DEVICE AND ELECTRIC DEVICE USING THE SAME

CROSS REFERENCE TO RELATED APPLICATION

The present application claims priority to Japanese Patent Application No. 2011-257657, filed Nov. 25, 2011, incorporated herein in its entirety.

TECHNICAL FIELD

The present invention relates to a separator for an electric device.

BACKGROUND

In recent years, research and development of hybrid vehicles (HEV), electric vehicles (EV) and fuel cell vehicles are being carried out and part of these vehicles have been manufactured and sold. These types of vehicles are called electric-powered vehicles and receiving attention in view of increased environmental concern and high fuel efficiency. In the electric-powered vehicles, the use of chargeable-dischargeable power supply systems is essential. As for such power supply systems, electric devices including secondary batteries such as lithium ion secondary batteries and nickel hydride secondary batteries or electric double-layer capacitors, are generally used. Among these, lithium ion secondary batteries are particularly suitable for used in the electric-powered vehicles due to high energy density and high resistance to repeated charge and discharge.

For example, a lithium ion secondary battery applied to an electric-powered vehicle is required to have higher output performance and higher capacity. In order to achieve higher output performance and higher capacity, an increase in size and an increase in the number of layers may be considered. However, these means may be accompanied by entrance of foreign substances into separators during the manufacture of the lithium ion secondary battery. The reason of the entrance of the foreign substances is that the separators used in the lithium ion secondary battery generally include porous substrates for conducting ions therethrough. Namely, the porous substrates have a large number of pores due to the porous structure thereof so that the foreign substances easily enter through the pores. Examples of the foreign substances include dendrites and metal pieces derived from metal foil produced during the manufacturing process. In view of the safety aspect, the entrance of such foreign substances into the separators is required to be prevented because the entrance of the foreign substances may cause a short circuit.

In order to solve the above-mentioned problem, research and development of ceramic separators are being carried out in recent years. A ceramic separator has a constitution in which a ceramic layer containing ceramic particles and a binder is formed on a surface of a porous substrate. The ceramic separator provided with the ceramic layer thereon can prevent foreign substances from entering through pores of the porous substrate.

Japanese Unexamined Patent Application Publication No. 2010-055942 discloses a separator for a non-aqueous secondary battery in which a heat-resistant porous layer containing inorganic fillers (ceramic particles) is stacked on one surface or both surfaces of thermoplastic resin having a microporous film (a porous substrate).

SUMMARY

However, it was revealed that, according to the separator for a non-aqueous secondary battery disclosed in Japanese Unexamined Patent Application Publication No. 2010-055942, the durability of cells decreases through repeated use. The ceramic separator applied to an electric device causes a decrease in cycle property of the electric device compared with the case of a separator including no ceramic layer. It was also revealed that the ceramic separator may cause a decrease in output performance of the electric device depending on the configuration of the ceramic layer of the ceramic separator to be employed. Thus, an object of the present invention is to provide a separator for an electric device that contributes to ensuring a high cycle property and preventing a decrease in output performance in an electric device to which the separator is applied.

A separator for an electric device according to a first aspect of the present invention includes: a porous substrate layer; and first and second ceramic layers formed on each surface of the porous substrate layer and each containing ceramic particles and a binder, wherein a specific surface area of the first ceramic layer is smaller than a specific surface area of the second ceramic layer, and the first ceramic layer is located towards a negative electrode of an electric device.

DESCRIPTION OF EMBODIMENTS

Figure 1:
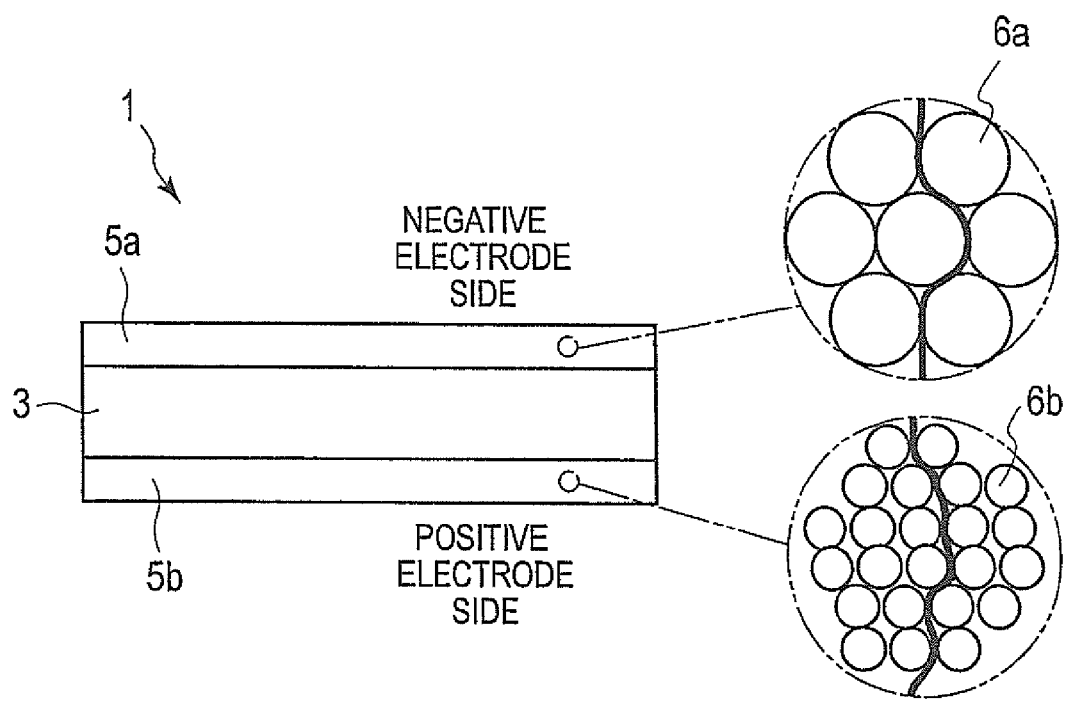
FIG. 1 is a schematic view showing a separator for an electric device according to an embodiment of the present invention.

An embodiment of the present invention relates to a separator for an electric device including a porous substrate layer and first and second ceramic layers formed on the respective surfaces of the porous substrate layer (hereinafter, also referred to as "a ceramic separator"). The specific surface area of the first ceramic layer is smaller than that of the second ceramic layer. The separator for an electric device is characterized in that the first ceramic layer is located on the negative electrode side of the electric device.

Hereinafter, the present embodiment will be explained with reference to the drawings; however, the scope of the present invention should be defined based on the claims and is not limited only to the embodiment described below. It should be noted that dimensional ratios in the drawings are magnified for convenience of explanation and may be different from actual ratios.

[Separator for Electric Device]

FIG. 1 is a schematic view showing a separator for an electric device according to an embodiment of the present invention. As shown in FIG. 1, the separator for an electric device 1 of the present embodiment is obtained in a manner such that a first ceramic layer 5a and a second ceramic layer 5b are respectively formed on the upper surface and the lower surface of a porous substrate layer 3 containing polyethylene (PE). The first ceramic layer 5a contains α-alumina particles as ceramic particles 6a and carboxymethylcellulose (CMC) as a binder. The second ceramic layer 5b contains θ-alumina particles as ceramic particles 6b and CMC as a binder. The specific surface area of the first ceramic layer 5a is 10 m$^2$/g, and the specific surface area of the second ceramic layer 5b is 34 m$^2$/g. Namely, the specific surface area of the first ceramic layer 5a is smaller than the specific surface area of the second ceramic layer 5b. The thickness of the first ceramic layer 5a is 3.95 μm, and the thickness of the second ceramic layer 5b is 7.68 μm. A ratio R of the thicknesses of the respective ceramic layers represented by the following formula is 1.9.

$$R = \text{thickness of second ceramic layer(μm)/thickness of first ceramic layer(μm)} \qquad 5$$

The first ceramic layer 5a is located on the negative electrode side of the electric device, and the second ceramic layer 5b is located on the positive electrode side of the electric device. The porous substrate layer 3 is a microporous film having porosity of 55%. The total thickness of the separator is 27.63 μm. Note that, in the present description, "the specific surface area of the ceramic layer" is a specific surface area that the ceramic layer entirely has. As shown in FIG. 1, the smaller the specific surface area of the ceramic layer, the lower the porosity between the adjacent ceramic particles, and ions are thus hardly transmitted therethrough. On the other hand, the larger the specific surface area of the ceramic layer, the greater the porosity between the adjacent ceramic particles, and ions are thus easily transmitted therethrough. Note that, in the present description, "the specific surface area of the ceramic particles" is a specific surface area that one ceramic particle has. Here, the specific surface area is measured by a method employed in examples described below.

The separator for an electric device shown in FIG. 1 to be provided according to the present embodiment is a ceramic separator that can contribute to ensuring a high cycle property and preventing a decrease in output performance in an electric device to which the separator is applied.

The reason why the cycle property decreases in the electric device to which the ceramic separator is applied may be that resolution of a component of an electrolysis solution produced due to the action of the ceramic particles as a catalyst. The resolution of the component of the electrolysis solution occurs depending on potential. In particular, the resolution tends to occur with potential in a region on the negative electrode side. On the other hand, the resolution of the component of the electrolysis solution hardly occurs in a region on the positive electrode side, and there is hardly any problem in this case. In view of this, the ceramic separator for an electric device that contributes to ensuring a high cycle property in the electric device can be provided in such a manner as to prevent a resolution reaction of the component of the electrolysis solution on the negative electrode side. According to the separator for an electric device shown in FIG. 1, the ceramic layer on the negative electrode side (the first ceramic layer) where the resolution reaction of the component of the electrolysis solution tends to easily occur, has a smaller specific surface area which is 10 $m^2/g$. In other words, the porosity between the adjacent ceramic particles in the ceramic layer is small so that the ceramic particles have little chance of coming into contact with the component of the electrolysis solution, and the resolution of the component of the electrolysis solution thus hardly occurs when the separator is applied to the electric device. Consequently, the electric device to which the ceramic separator according to the present embodiment is applied can ensure a high cycle property.

In general, in the case of manufacturing a large-sized electric device such as a lithium ion secondary battery in order to ensure higher output performance and higher capacity, variation in potential increases so that a resolution reaction of a component of an electrolysis solution may locally progress. As a result, a significant decrease in cycle property may be revealed because of the resolution of the component of the electrolysis solution when the large-sized electric device employs a ceramic separator. However, according to the ceramic separator of the present embodiment, the ceramic particles still have little chance of coming into contact with the component of the electrolysis solution even when the separator is applied to a large-sized electric device. Therefore, the electric device having a high cycle property can be provided. Accordingly, the ceramic separator of the present embodiment can exhibit the effects of the present invention more effectively as the size of the electric device to which the separator is applied increases.

The reason why the output performance decreases in the electric device to which the ceramic separator is applied may be that ion conductivity decreases. In particular, the output performance may decrease because of difficulty in conducting ions although a high cycle property can be ensured when employing the ceramic separator with the specific surface area of the ceramic layer decreased in order to have little chance of coming into contact with the component of the electrolysis solution as described above. However, according to the separator for an electric device shown in FIG. 1, the specific surface area of the ceramic layer located on the positive electrode side (the second ceramic layer) is 34 $m^2/g$, which is larger than that of the first ceramic layer. Namely, the porosity between the adjacent ceramic particles on the positive electrode side is large so as to increase the contact between the positive electrode and the electrolysis solution held in the ceramic separator applied to the electric device. As a result, the reaction in the positive electrode further progresses so that the amount of lithium ions released from the positive electrode increases. Accordingly, even if the ion conductivity in the first ceramic layer decreases, a decrease in output performance can be prevented since a large amount of the lithium ions released from the positive electrode compensates for the decrease of the ion conductivity.

As described above, the separator for an electric device according to the present embodiment can contribute to ensuring a high cycle property and preventing a decrease in output performance in the electric device to which the separator is applied in a manner such that the specific surface area of the first ceramic layer is set to be smaller than the specific surface area of the second ceramic layer.

Next, the respective constituent elements of the separator for an electric device according to the present embodiment will be explained in detail below.

[Porous Substrate Layer]

The porous substrate layer functions to ensure ion conductivity between the positive electrode and the negative electrode in the electric device. In view of the safety aspect, the porous substrate layer preferably contains a component that can provide what is called a shutdown function to the ceramic separator.

The material of the porous substrate layer is not particularly limited, and conventionally-known materials may be used. Examples of the material include polyethylene (PE), polypropylene (PP), polystyrene (PS), polyvinyl acetate (PVAc), polyethylene terephthalate (PET), polyvinylidene fluoride (PVdF), polytetrafluoroethylene (PTFE), polysulfone (PSF), polyether sulfone (PES), polyetheretherketone (PEEK), polyimide (PI), polyamideimide (PAI), phenol resin, epoxy resin, melamine resin, urea resin, alkyd resin, and polyurethane. Among these materials, the porous substrate layer preferably contains PE, PP or a copolymer obtained by copolymerizing ethylene and propylene (an ethylene-propylene copolymer) in terms of a monomer unit each having a melting temperature in the range from 100° C. to 250° C. in order to provide the shutdown function to the separator. Alternatively, the porous substrate layer may be formed in a manner such that the materials described above are stacked on top of one another. An example of the porous substrate layer having a stacked structure is a porous substrate layer having a triple-layer structure of PP/PE/PP. In the stacked porous substrate layer, a shutdown occurs when the battery temperature reaches 130° C. which is a melting point of PE. Even if the battery temperature keeps increasing after the shutdown, the entire short circuit can be prevented since meltdown is not caused until the battery temperature reaches 170° C. which is a melting point of PP.

The configuration of the porous substrate layer is not particularly limited, and examples thereof include woven fabric, nonwoven fabric, and a microporous film. In order to ensure high ion conductivity in the porous substrate layer, the porous substrate layer preferably has a high-porosity structure. In view of the improvement in battery performance, the configuration of the porous substrate layer is preferably a microporous film. The porosity of the porous substrate layer is preferably in the range from 40% to 85%. The porosity of 40% or higher can ensure sufficient ion conductivity. The porosity of 85% or lower can keep the strength of the porous substrate layer. Here, the porosity is calculated according to the following formula under the conditions where true density of resin is defined as D1 (g/cm$^3$) and bulk density of a resin porous body is defined as d1 (g/cm$^3$).

$$\text{Porosity}(\%) = \{(D1-d1)/D1\} \times 100$$

The porous substrate layer may be manufactured by a conventionally-known method. Examples of the method include a stretch pore-forming method and a phase separation method for producing a microporous film, and an electrospinning method for producing nonwoven fabric.

The thickness of the porous substrate layer is not particularly limited but is preferably in the range from 10 μm to 25 μm, more preferably in the range from 12 μm to 20 μm.

[Ceramic Layer]

The ceramic layer is required to include the first ceramic layer located on the negative electrode side of the electric device and the second ceramic layer located on the positive electrode side of the electric device, each containing the ceramic particles and the binder. The specific surface area of the first ceramic layer is smaller than the specific surface area of the second ceramic layer so as to ensure a high cycle property and prevent a decrease in output performance in the electric device to which the separator is applied. Here, Patent Literature 1 describes a preferred embodiment of a separator for a non-aqueous battery in which the specific surface area of inorganic fillers is in the range from 4 m$^2$/g to 200 m$^2$/g. The present invention differs from Patent Literature 1 in that the present invention focuses on "the specific surface area of the ceramic layer", while Patent Literature 1 describes the specific surface area with regard to the inorganic fillers ("the specific surface area of ceramic particles"). In addition, the determination of the specific surface area of the inorganic fillers in Patent Literature 1 is based on the considerations of resistance to flame, formability, strength of film application and cost, which can be generally-considered matters. Patent Literature 1 further teaches that, in the separator for a non-aqueous battery, a heat-resistant porous layer containing the inorganic fillers is only required to be formed at least on one surface of thermoplastic resin. Thus, Patent Literature 1 does not teach that the ceramic layers formed on the respective surfaces of the separator have different specific surface areas.

The specific surface area of the first ceramic layer is not particularly limited but is preferably in the range from 10 m$^2$/g to 21 m$^2$/g, more preferably in the range from 10 m$^2$/g to 18 m$^2$/g, even more preferably in the range from 10 m$^2$/g to 15 m$^2$/g. The first ceramic layer with the specific surface area of 10 m$^2$/g or greater is preferable because excessive suppression of ion conductivity is avoided and an excessive decrease in output performance is prevented. In addition, the first ceramic layer with the specific surface area of 21 m$^2$/g or smaller is preferable because a sufficient cycle property can be obtained.

The specific surface area of the second ceramic layer is not particularly limited but is preferably in the range from 30 m$^2$/g to 100 m$^2$/g. The second ceramic layer with the specific surface area of 30 m$^2$/g or greater is preferable because the positive electrode active material can come into contact with the electrolysis solution sufficiently when the separator is applied to the electric device. In addition, the second ceramic layer with the specific surface area of 100 m$^2$/g or smaller is preferable because the pores are not excessively present in the second ceramic layer so that entrance of foreign substances can be prevented.

The specific surface area of the ceramic layer may be adjusted in such a manner as to change the conditions of the constituent elements contained in the ceramic layer as appropriate, in particular, the type, the particle diameter and the specific surface area of the ceramic particles; the type and the added amount of the binder; and other additives contained in the ceramic layer. For example, the specific surface area of the ceramic layer may decrease when ceramic particles having a larger particle diameter are used in the ceramic layer. Further, the specific surface area of the ceramic layer may decrease when the added amount of the binder in the ceramic layer increases.

The porosity of the ceramic layer is not particularly limited; however, the porosity of the first ceramic layer is preferably in the range from 40% to 70%, more preferably in the range from 50% to 60%. The porosity of the second ceramic layer is preferably in the range from 70% to 90%, more preferably in the range from 75% to 85%. The porosity is calculated according to the following formula under the conditions where true density of the ceramic particles is defined as D2 (g/cm$^3$) and bulk density of the ceramic layer is defined as d2 (g/cm$^3$).

$$\text{Porosity}(\%) = \{(D2-d2)/D2\} \times 100$$

The thickness of the ceramic layer is not particularly limited; however, the thickness of the first ceramic layer is preferably in the range from 2 μm to 7 μm, more preferably in the range from 2 μm to 4 μm. The thickness of the second ceramic layer is preferably in the range from 3 μm to 10 μm, more preferably in the range from 4 μm to 8 μm. The thicknesses of the first ceramic layer and the second ceramic layer are preferably determined in a manner such that the ratio R of the thicknesses of the respective ceramic layers represented by the following formula:

$$R = \text{thickness of second ceramic layer}(\mu m)/\text{thickness of first ceramic layer}(\mu m)$$

is in the range from 1 to 3. The R value in the range from 1 to 3 is preferable because the mechanical strength does not differ largely between the first and second ceramic layers so that the separator is hardly curled during the manufacture of the electric device.

The ceramic particles are a constituent element of the ceramic layer to prevent foreign substances from entering the separator during the manufacturing process.

The ceramic particles are not particularly limited, and conventionally-known materials may be used. Examples of the ceramic particles include silica ($SiO_2$), alumina ($Al_2O_3$), alumina silicate ($SiO_2/Al_2O_3$; a molar ratio of $SiO_2$ and $Al_2O_3$ ($SiO_2/Al_2O_3$ ratio) in this case is in the range from 1 to 1000), zirconia ($ZrO_2$), ceria ($CeO_2$), and titania ($TiO_2$). These ceramic particles may be used alone or in combination of two or more. In addition, the first and second ceramic layers may contain different types and constitutions of ceramic particles. For example, there are several types of alumina, such as α-alumina, θ-alumina and γ-alumina, having different crystal structures. When these types of alumina have a constant particle diameter, the ceramic particles have different specific surface areas. The specific surface area of the ceramic particles may be controlled in such a manner as to adjust the content ratio of these types of the ceramic particles as appropriate. For example, the specific surface area of α/θ mixed alumina containing α-alumina and θ-alumina may vary depending on the adjusted content ratio of each alumina.

The specific surface area of the ceramic particles is not particularly limited, and an arbitrary specific surface area may be employed. The specific surface area of the ceramic particles used in the first ceramic layer is preferably in the range from $5 \text{ m}^2/\text{g}$ to $23 \text{ m}^2/\text{g}$, more preferably in the range from $5 \text{ m}^2/\text{g}$ to $15 \text{ m}^2/\text{g}$. The specific surface area of the ceramic particles used in the second ceramic layer is preferably in the range from $50 \text{ m}^2/\text{g}$ to $100 \text{ m}^2/\text{g}$, more preferably in the range from $50 \text{ m}^2/\text{g}$ to $70 \text{ m}^2/\text{g}$.

The particle diameter of the ceramic particles is not particularly limited, and an arbitrary particle diameter may be employed. The particle diameter of the ceramic particles used in the first ceramic layer is preferably in the range from $0.1 \text{ μm}$ to $10 \text{ μm}$, more preferably in the range from $0.3 \text{ μm}$ to $5 \text{ μm}$. The particle diameter of the ceramic particles used in the second ceramic layer is preferably in the range from $0.1 \text{ μm}$ to $10 \text{ μm}$, more preferably in the range from $0.5 \text{ μm}$ to $8 \text{ μm}$.

The shape of the ceramic particles is not particularly limited, and conventionally-known shapes may be used. Examples thereof include a spherical shape, an oval shape, a needle-like shape, a columnar shape such as a cylinder or a polygonal column, a rod-like shape, a plate-like shape, and a disk-like shape. The ceramic separator according to the present embodiment can be manufactured in a manner such that the ceramic layers are applied and solidified onto the porous substrate layer. During the solidification, stress is generated and as a result, the ceramic separator may be curled. Therefore, the ceramic particles having a shape capable of dispersing the generated stress are preferably used. In view of this, the shape of the ceramic particles is preferably at least one type selected from the group consisting of a spherical shape, a needle-like shape and a columnar shape.

Here, the catalytic action on the component of the electrolysis solution and the potential suitable for the resolution reaction may vary depending on the ceramic particles used. It should be noted that, regardless of the type of the ceramic particles used, a reduction in cycle property of an electric device may be caused in general when a ceramic separator is applied to the electric device.

The binder is a constituent element of the ceramic layer to function to bind the adjacent ceramic particles together and bind the ceramic particles to the porous substrate layer.

(Binder) The binder is not particularly limited, and conventionally-known materials may be used. Examples of the binder include carboxymethylcellulose (CMC), polyacrylonitrile, cellulose, an ethylene-vinyl acetate copolymer, polyvinyl chloride, styrene butadiene rubber (SBR), isoprene rubber, butadiene rubber, polyvinylidene fluoride (PVdF), polytetrafluoroethylene (PTFE), polyvinyl fluoride (PVF), and methyl acrylate. These materials may be used alone or in combination of two or more. Among these binders, carboxymethylcellulose (CMC) and polyvinylidene fluoride (PVdF) are preferable.

The added amount of the binder is not particularly limited. However, the binder is preferably added in a manner such that the weight ratio of the ceramic layer and the porous substrate layer (the weight of the ceramic layer/the weight of the porous substrate layer) is in the range from 0.8 to 3, preferably in the range from 1 to 2. In the present description, the "weight" represents a weight (g) per square meter (the unit is $[\text{g/m}^2]$). It should be noted that the weight ratio obtained by dividing the weight value of the ceramics layer by the weight value of the porous substrate layer has no unit.

The total thickness of the separator for an electric device is preferably reduced to a certain extent in view of the improvement in battery performance. In particular, the total thickness of the separator is preferably in the range from $10 \text{ μm}$ $40 \text{ μm}$, more preferably in the range from $20 \text{ μm}$ to $30 \text{ μm}$. The total thickness of $10 \text{ μm}$ or greater can ensure the strength of the separator. The total thickness of $40 \text{ μm}$ or smaller can contribute to forming a small-sized battery. Note that another layer may be interposed between the porous substrate layer and the ceramic layer, which is also included in the scope of the present invention as long as desired effects can be obtained. When such a third layer is interposed, the total thickness also includes the thickness of the third layer.

With regard to a specific manufacture method of the ceramic separator, for example, the separator may be manufactured in a manner such that a solution obtained by dispersing the ceramic particles and the binder in a solvent is applied to the porous substrate layer, and the solvent is then removed therefrom.

The solvent used in this case is not particularly limited, but examples thereof include N-methyl-2-pyrrolidone (NMP), dimethylformamide, dimethylacetamide, methylformamide, cyclohexane, hexane, and water. When polyvinylidene fluoride (PVdF) is used as a binder, NMP is preferably used as a solvent. The temperature at which the solvent is removed is not particularly limited and may be determined as appropriate depending on the solvent used. For example, the temperature may be in the range from 50° C. to 70° C. when water is used as a solvent, and the temperature may be in the range from 70° C. to 90° C. when NMP is used as a solvent. The solvent may be removed under reduced pressure as necessary. Here, the solvent may partly be left without completely removed.

[Electric Device (Lithium Ion Secondary Battery)]

The separator for an electric device according to the present invention can be used for an electric device including a secondary battery such as a lithium ion secondary battery and a nickel hydrogen secondary battery or an electric double-layer capacitor due to the characteristics of the separator described above. In particular, the separator can be suitably used for a lithium ion secondary battery having high energy density and high resistance to repeated charge and discharge.

Figure 2:
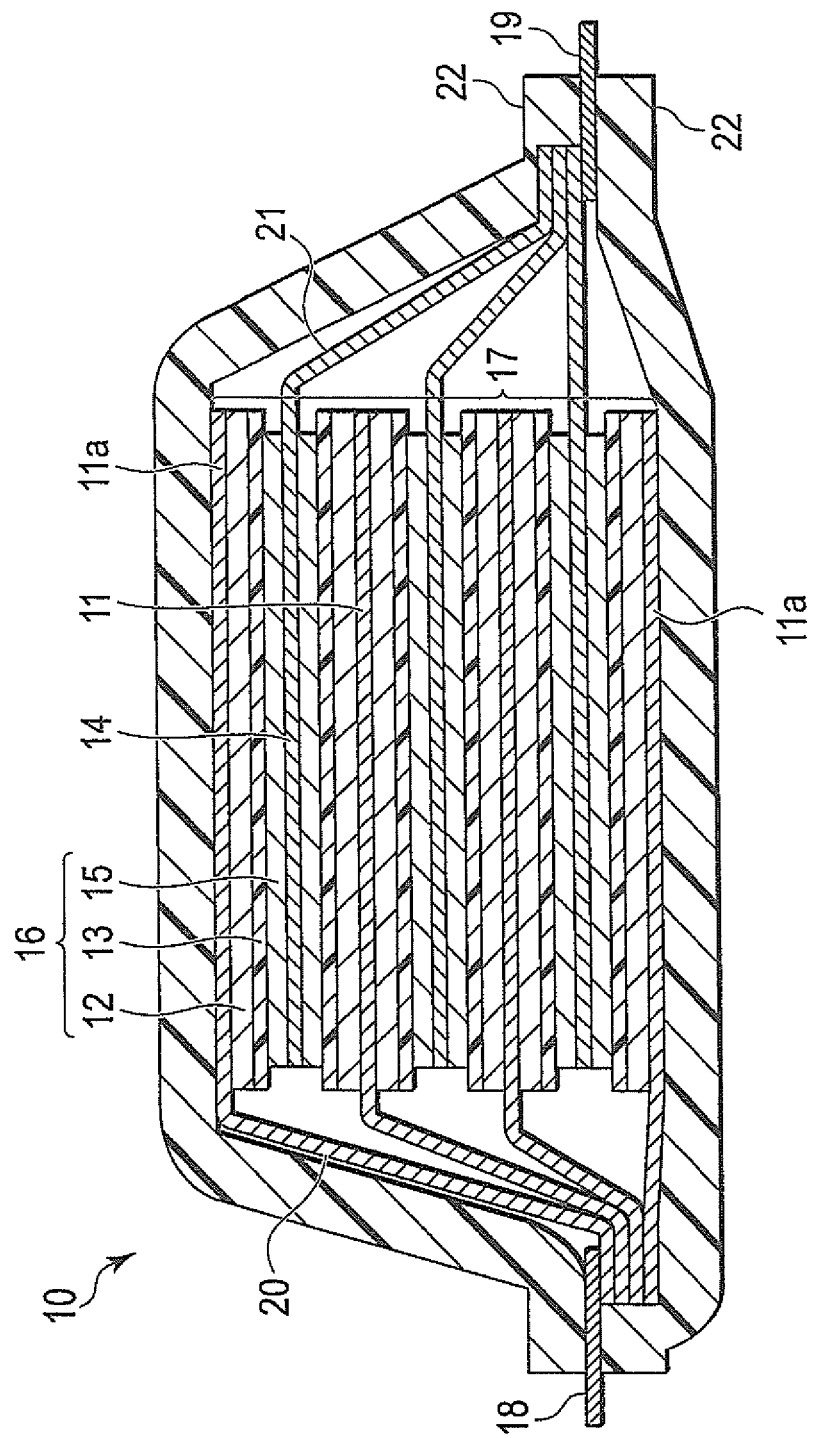
FIG. 2 is a schematic cross-sectional view showing the entire structure of a lithium ion secondary battery which is not a bipolar type but a laminated type according to an embodiment of the present invention.

FIG. 2 shows a schematic cross-sectional view showing the entire structure of a lithium ion secondary battery which is not a bipolar type but a laminated type according to an embodiment of the present invention. As shown in FIG. 2, the lithium ion secondary battery 10 according to the present embodiment has a configuration in which a substantially rectangular power generation element 17, in which a charge-discharge reaction actually progresses, is sealed inside a laminate film 22 as a battery exterior member. In particular, the lithium ion secondary battery 10 has a configuration in which the power generation element 17 is housed and sealed inside a polymer-metal composite laminate film used as a battery exterior member in a manner such that the entire periphery of the laminate film is thermally fused.

The power generation element 17 has a configuration in which negative electrodes, electrolyte layers 13 and positive electrodes are stacked, each negative electrode having a configuration in which negative electrode active material layers 12 are provided on both surfaces of a negative electrode current collector 11 (note that the lowermost layer and the uppermost layer of the power generation element are each provided with the active material layer only on one surface thereof), each positive electrode having a configuration in which positive electrode active material layers 15 are provided on both surfaces of a positive electrode current collector 14. In particular, several sets of the negative electrode, the electrolyte layer and the positive electrode arranged in this order are stacked on top of each other in a manner such that one negative electrode active material layer 12 faces the adjacent positive electrode active material layer 15 with the electrolyte layer 13 interposed therebetween.

The negative electrode, the electrolyte layer 13, and the positive electrode which are adjacent to one another thus constitute a single cell layer 16. Namely, the lithium ion secondary battery 10 according to the present embodiment has a configuration in which the plural single cell layers 16 are stacked on top of each other so as to be electrically connected in parallel. The periphery of each of the single cell layers 16 may be provided with a seal member (an insulation layer) (not shown in the figure) for insulation between the negative electrode current collector 11 and the positive electrode current collector 14 adjacent to each other. The outermost negative electrode current collectors 11a located on the respective outermost layers of the power generation element 17 are each provided with the negative electrode active material layer 12 only on one side thereof. Alternatively, the outermost positive electrode current collectors may be located on the respective outermost layers of the power generation element 17 and may each be provided with the positive electrode active material layer only on one side thereof in a manner such that the positions of the negative electrode and the positive electrode are reversed.

A negative electrode current collecting plate 18 and a positive electrode current collecting plate 19 which are electrically conductive to the respective electrodes (the positive electrodes and the negative electrodes) are attached to the negative electrode current collectors 11 and the positive electrode current collectors 14 respectively. The respective current collecting plates are held by each end portion of the laminate film 22 and exposed to the outside of the laminate film 22. The negative electrode current collecting plate 18 and the positive electrode current collecting plate 19 may be attached by, for example, ultrasonic welding or resistance welding, to the negative electrode current collectors 11 and the positive electrode current collectors 14 of the respective electrodes via negative electrode terminal leads 20 and positive electrode terminal leads 21 as necessary (FIG. 2 shows this configuration). Note that each negative electrode current collector 11 may be elongated to serve as the negative electrode current collecting plate 18 and exposed to the outside of the laminate film 22. Similarly, each positive electrode current collector 14 may be elongated to serve as the positive electrode current collecting plate 19 and exposed to the outside of the laminate film 22.

In FIG. 2, the separator for an electric device composes the electrolyte layer 13 together with the electrolysis solution. The laminated type lithium ion secondary battery shown in FIG. 2 can ensure a high cycle property and prevent a decrease in output performance due to the use of the ceramic separator.

Note that the respective constituent elements shown in FIG. 2 are not particularly limited, and conventionally-known elements may also be used.

EXAMPLES

Example 1

A melting mixture of polyethylene (PE) and liquid paraffin as a plasticizer was extruded into a sheet-like shape, and the liquid paraffin was then removed therefrom by use of an extraction solvent. The sheet-like PE was further subjected to uniaxial stretching to obtain a PE microporous film (thickness: 16 μm, porosity: 55%). Next, an aqueous solution obtained in a manner such that 95% by mass of α-alumina ($Al_2O_3$) particles (specific surface area: 5 $m^2/g$) and 5% by mass of carboxymethylcellulose (CMC) were uniformly dispersed in water, was applied to one surface of the PE microporous film by use of a gravure coater. Similarly, an aqueous solution obtained in a manner such that 95% by mass of θ-alumina particles (specific surface area: 52 $m^2/g$) and 5% by mass of CMC were uniformly dispersed in water, was applied to the opposite surface of the PE microporous film by use of a gravure coater. Subsequently, the water was removed therefrom at 60° C. so as to prepare a separator for an electric device in which a first ceramic layer containing the α-alumina particles and a second ceramic layer containing the θ-alumina particles were formed on the surfaces of the PE microporous film. The thickness of the first ceramic layer was 3.95 μm, the thickness of the second ceramic layer was 7.68 μm, and the total thickness of the separator was 27.63 μm. Namely, the ratio R of the thickness of the second ceramic layer to the thickness of the first ceramic layer is 1.9. The specific surface area of the first ceramic layer was 10 $m^2/g$, and the specific surface area of the second ceramic layer was 34 $m^2/g$. Here, the specific surface area, which is a BET specific surface area, was measured by a nitrogen adsorption BET single-point method by use of a continuous flow surface area analyzer SA-960 (manufactured by Horiba Ltd.). In particular, after heating in air at 120° C. for 30 minutes before measurement, the sample was introduced into the analyzer and subjected to the measurement by use of nitrogen gas ($N_2$ gas) as carrier gas at 120° C. for 20 minutes.

Example 2

A separator for an electric device of this example was prepared in a manner similar to Example 1 except that α/θ mixed alumina (specific surface area: 9.5 $m^2/g$) was used instead of the θ-alumina particles used in Example 1. The specific surface area of the first ceramic layer in this case was 14 $m^2/g$.

Example 3

A separator for an electric device of this example was prepared in a manner similar to Example 1 except that α/θ mixed alumina (specific surface area: 15 $m^2/g$) was used instead of the θ-alumina particles used in Example 1. The specific surface area of the first ceramic layer in this case was 18 $m^2/g$.

Comparative Example 1

A separator for an electric device of this example was prepared in a manner similar to Example 1 except that α-alumina particles (specific surface area: 5 $m^2/g$) were used as ceramic particles, the thicknesses of the first and second ceramic layers were both set to 4.5 μm (the ratio R of the thickness of the second ceramic layer to the thickness of the first ceramic layer is 1), and the total thickness of the separator was 25 μm. The specific surface areas of the first and second ceramic layers were both 10 m$^2$/g.

Comparative Example 2

A separator for an electric device of this example was prepared in a manner similar to Comparative Example 1 except that α/θ mixed alumina (specific surface area: 15 m$^2$/g) of Example 3 was used for ceramic particles. The specific surface areas of the first and second ceramic layers were both 18 m$^2$/g.

Comparative Example 3

A separator for an electric device of this example was prepared in a manner similar to Comparative Example 1 except that θ-alumina particles (specific surface area: 52 m$^2$/g) were used as ceramic particles. The specific surface areas of the first and second ceramic layers were both 34 m$^2$/g.

Table 1 summarizes the separators prepared in Examples 1 to 3 and Comparative Examples 1 to 3. The specific surface area of the first ceramic layer is smaller than that of the second ceramic layer in each of Examples 1 to 3, and the specific surface areas of the first and second ceramic layers are the same in each of Comparative Examples 1 to 3.

Next, tabs (positive electrode: Al tab, negative electrode: Ni tab) were attached, by ultrasonic welding, to portions of the respective electrodes to which no slurry was applied. The positive electrode, the separator and the negative electrode were then stacked in this order and laminated in vacuum so as to manufacture a simple lithium ion secondary battery. In this case, the separator of Example 1 is used in a manner such that the first ceramic layer is located on the negative electrode side of the electric device. Here, the electrolysis solution for use in the manufactured simple lithium ion secondary battery was obtained in a manner such that lithium salt LiPF$_6$ was dissolved, at a concentration of 1 M, into a solvent in which ethylene carbonate (EC) and diethylene carbonate (DEC) were mixed in the volume ratio of 2:3.

Example 5

A lithium ion secondary battery of this example was manufactured in a manner similar to Example 4 using the ceramic separator of Example 2.

Example 6

A lithium ion secondary battery of this example was manufactured in a manner similar to Example 4 using the ceramic separator of Example 3.

TABLE 1

| | Porous Substrate Type | First Ceramic Layer | | | Second Ceramic Layer | | | Ceramic Separator | |
| | | Type | Thickness (μm) | Specific Surface Area (m$^2$/g) | Type | Thickness (μm) | Specific Surface Area (m$^2$/g) | Binder Type | R* | Total Thickness (μm) |
|---|---|---|---|---|---|---|---|---|---|---|
| Example 1 | PE | α-alumina | 3.95 | 10 | θ-alumina | 7.68 | 34 | CMC | 1.9 | 27.63 |
| Example 2 | PE | α/θ mixed alumina | 3.95 | 14 | θ-alumina | 7.68 | 34 | CMC | 1.9 | 27.63 |
| Example 3 | PE | α/θ mixed alumina | 3.95 | 18 | θ-alumina | 7.68 | 34 | CMC | 1.9 | 27.63 |
| Comparative Example 1 | PE | α-alumina | 4.5 | 10 | α-alumina | 4.5 | 10 | CMC | 1 | 25 |
| Comparative Example 2 | PE | α/θ mixed alumina | 4.5 | 18 | α/θ mixed alumina | 4.5 | 18 | CMC | 1 | 25 |
| Comparative Example 3 | PE | θ-alumina | 4.5 | 34 | θ-alumina | 4.5 | 34 | CMC | 1 | 25 |

*R = Thickness of Second Ceramic Layer/Thickness of First Ceramic Layer

Example 4

A lithium ion secondary battery was manufactured by use of the ceramic separator of Example 1.

First, 85% by mass of lithium manganate (LiMn$_2$O$_4$), 5% by mass of acetylene black, 10% by mass of polyvinylidene fluoride (PVdF), and an appropriate amount of N-methyl-2-pyrrolidone (NMP) were mixed together so as to prepare positive electrode active material slurry.

Similarly, 90% by mass of graphite, 5% by mass of acetylene black, 10% by mass of PVdF, and an appropriate amount of NMP were mixed together so as to prepare negative electrode active material slurry.

The prepared positive electrode active material slurry and negative electrode active material slurry were applied to aluminum foil and copper foil respectively, and these were then dried to prepare electrodes (a positive electrode and a negative electrode). The electrodes thus obtained were each cut into a square of 4.8 cm×4.8 cm. The separator for an electric device of Example 1 was cut into a square of 5.0 cm×5.0 cm.

Comparative Example 4

A lithium ion secondary battery of this example was manufactured in a manner similar to Example 4 using the ceramic separator of Comparative Example 1.

Comparative Example 5

A lithium ion secondary battery of this example was manufactured in a manner similar to Example 4 using the ceramic separator of Comparative Example 2.

Comparative Example 6

A lithium ion secondary battery of this example was manufactured in a manner similar to Example 4 using the ceramic separator of Comparative Example 3.

The following test was carried out by use of the lithium ion secondary batteries in each example prepared as described above.

<Cycle Test: Evaluation of Cycle Property>

The lithium ion secondary battery prepared in each of Examples 4 to 6 and Comparative Examples 4 to 6 was charged to 4.2 V at 25° C. by a constant current method (CC, current: 1 C). After temporarily stopped for 10 minutes, the lithium ion secondary battery was discharged to 2.5 V at constant current (CC, current: 1 C) and again stopped for 10 minutes after the discharge. This charge-discharge process was defined as one cycle, and the cycle was repeated 150 times. The discharge capacity maintenance ratios after particular cycles for each example were measured so as to evaluate the cycle property.

Table 2 shows the obtained results. Note that Table 2 shows the discharge capacity at each cycle with respect to the discharge capacity at the first cycle in each example in terms of percentage.

TABLE 2

| | Specific Surface Area of Ceramic Layer of Separator ($m^2/g$) | | | Cycle Number (Cycles) | | | | |
|---|---|---|---|---|---|---|---|---|
| | First Ceramic Layer | Second Ceramic Layer | | 1 | 10 | 50 | 100 | 150 |
| Example 4 | 10 | 34 | Capacity | 100 | 99 | 95 | 90 | 84 |
| Example 5 | 14 | 34 | Maintenance | 100 | 98 | 94 | 89 | 82 |
| Example 6 | 18 | 34 | Ratio (%) | 100 | 98 | 93 | 88 | 82 |
| Comparative Example 4 | 10 | 10 | | 100 | 99 | 94 | 88 | 82 |
| Comparative Example 5 | 18 | 18 | | 100 | 97 | 93 | 86 | 83 |
| Comparative Example 6 | 34 | 34 | | 100 | 95 | 92 | 80 | — |

It is apparent from the results of Table 2 that, according to the relationship between the specific surface area of the first ceramic layer (the ceramic layer on the negative electrode side) and the capacity maintenance ratio, Examples 4 to 6 and Comparative Examples 4 and 5 each including the first ceramic layer having a smaller specific surface area, had a higher cycle property. In particular, these examples kept a high capacity maintenance ratio which is 80% or higher even after the test repeating the charge-discharge cycle 150 times. In contrast, Comparative Example 6 in which the specific surface area of the first ceramic layer was larger had a lower cycle property than Examples 4 to 6 and Comparative Examples 4 and 5. In particular, Comparative Example 6 had a lower capacity maintenance ratio on the whole, in which the capacity maintenance ratio at 150th cycle was too low to be measured.

It is also apparent that the capacity maintenance ratio tends to be higher as the specific surface area of the first ceramic layer is smaller. For example, in the comparison among Examples 4 to 6, the capacity maintenance ratio at 100th cycle is 90% in Example 4 (the specific surface area of the first ceramic layer is 10 $m^2/g$), 89% in Example 5 (the specific surface area of the first ceramic layer is 14 $m^2/g$), and 88% in Example 6 (the specific surface area of the first ceramic layer is 18 $m^2/g$).

The results also revealed that the specific surface area of the second ceramic layer has a small contribution to the cycle property. In particular, Example 4 and Comparative Example 4 each including the first ceramic layer of the same specific surface area of 10 $m^2/g$, greatly differ in the specific surface area of the second layer (34 $m^2/g$ in Example 4 and 10 $m^2/g$ in Comparative Example 4). However, Example 4 and Comparative Example 4 have substantially the same capacity maintenance ratio at each cycle. The same interpretation can be applied to the case of the comparison between Example 6 and Comparative Example 5.

<Measurement of DC Resistance: Evaluation of Output Performance>

The lithium ion secondary battery prepared in each of Example 4 and Comparative Examples 4 and 6 was charged to 3.9 V at 25° C. by a constant current method (CC, current: 1 C). After temporarily stopped for 10 minutes, the lithium ion secondary battery was discharged for 20 seconds at constant current (CC, current: 1 C), and the DC resistance was then calculated from the voltage during the discharge. The relative value of the DC resistance in each of Example 4 and Comparative Example 4 was obtained using the DC resistance of Comparative Example 6 as a reference value (calculated according to the DC resistance value of Example 4 or Comparative Example 4/the DC resistance value of Comparative Example 6). Table 3 shows the obtained results.

TABLE 3

| | Specific Surface Area of Ceramic Layer of Separator ($m^2/g$) | | DC Resistance (Relative Value) |
|---|---|---|---|
| | First Ceramic Layer | Second Ceramic Layer | |
| Comparative Example 6 | 34 | 34 | 1 |
| Comparative Example 4 | 10 | 10 | 1.17 |
| Example 4 | 10 | 34 | 1.085 |

The results of Table 3 revealed that, according to the comparison between Comparative Example 6 and Comparative Example 4, the DC resistance increases as the specific surface areas of the first and second ceramic layers both decrease. The increase rate is 1.17 times. According to the comparison between Comparative Example 6 and Example 4, the DC resistance also increases although only the specific surface area of the first ceramic layer decreases; however, the increase rate is as small as 1.085 times.

It is apparent from the results that the output performance decreases as the specific surface area of the first ceramic layer decreases. However, the results also revealed that the increase of the specific surface area of the second ceramic layer can prevent the decrease of the output performance.

Although the present invention has been described above by reference to the examples, the present invention is not limited to the descriptions thereof, and it will be apparent to those skilled in the art that various modifications and improvements can be made.

According to the present invention, the suppression of the resolution of the electrolysis solution in the electric device to which the separator for an electric device is applied, can lead to an increase in cycle property, and the improvement in contact between the positive electrode and the electrolysis solution can prevent a decrease in output performance. Accordingly, the present invention is industrially applicable.

The invention claimed is:

1. A separator for an electric device, comprising:
    a porous substrate layer having a negative electrode facing surface and a positive electrode facing surface;
    a first ceramic layer formed on the negative electrode facing surface of the porous substrate layer and configured to contact a negative electrode; and
    a second ceramic layer formed directly on the positive electrode facing surface of the porous substrate layer, each of the first ceramic layer and the second ceramic layer containing ceramic particles and a binder,
    wherein a specific surface area of the first ceramic layer is smaller than a specific surface area of the second ceramic layer.

2. The separator for an electric device according to claim 1, wherein the specific surface area of the first ceramic layer is in a range from 10 $m^2$/g to 21 $m^2$/g.

3. The separator for an electric device according to claim 2, wherein the specific surface area of the first ceramic layer is in a range from 10 $m^2$/g to 15 $m^2$/g.

4. The separator for an electric device according to claim 1, wherein the specific surface area of the second ceramic layer is in a range from 30 $m^2$/g to 100 $m^2$/g.

5. The separator for an electric device according to claim 1, wherein the first ceramic layer and the second ceramic layer individually contain at least one element selected from the group consisting of alumina, silica, alumina silicate, zirconia, ceria, and titania.

6. The separator for an electric device according to claim 1, wherein a shape of the ceramic particles is at least one type selected from the group consisting of a spherical shape, a needle-like shape, and a columnar shape.

7. The separator for an electric device according to claim 1, wherein a ratio R of thicknesses of the first ceramic layer and the second ceramic layer is represented by the following formula:

$$R = \text{thickness of second ceramic layer } (\mu m)/\text{thickness of first ceramic layer } (\mu m) \text{ is in a range from 1 to 3.}$$

8. The separator for an electric device according to claim 1, wherein the specific surface area of the first ceramic layer is in a range from 10 $m^2$/g to 21 $m^2$/g, and the specific surface area of the second ceramic layer is in a range from 30 $m^2$/g to 100 $m^2$/g.

9. An electric device comprising the separator according to claim 1 and further comprising:
    a negative electrode directly adjacent the first ceramic layer and a positive electrode adjacent the second ceramic layer.

* * * * *